(12) United States Patent
Dutta et al.

(10) Patent No.: US 7,363,277 B1
(45) Date of Patent: Apr. 22, 2008

(54) DETECTING COPYRIGHT VIOLATION VIA STREAMED EXTRACTION AND SIGNATURE ANALYSIS IN A METHOD, SYSTEM AND PROGRAM

(75) Inventors: Rabindranath Dutta, Austin, TX (US); Kamal Chandrakant Patel, Cedar Park, TX (US)

(73) Assignee: International Business Machines Corporation, Armonk, NY (US)

(*) Notice: Subject to any disclaimer, the term of this patent is extended or adjusted under 35 U.S.C. 154(b) by 529 days.

(21) Appl. No.: 09/535,581

(22) Filed: Mar. 27, 2000

(51) Int. Cl.
*G06Q 40/00* (2006.01)
(52) U.S. Cl. .............................. 705/57; 705/58; 705/59
(58) Field of Classification Search .................. 713/200, 713/201, 202, 176, 177, 180; 705/57, 58, 705/59; 380/202, 203
See application file for complete search history.

(56) References Cited

U.S. PATENT DOCUMENTS 5,892,904 A * 4/1999 Atkinson et al. ............. 726/22
6,424,728 B1 * 7/2002 Ammar ....................... 382/119
6,466,670 B1 * 10/2002 Tsuria et al. ................. 380/202

FOREIGN PATENT DOCUMENTS

JP       2000076141 A  *  3/2000

* cited by examiner

*Primary Examiner*—Pierre Eddy Elisca
(74) *Attorney, Agent, or Firm*—Marilyn S. Dawkins; Dillon & Yudell LLP

(57) ABSTRACT

Signature analysis of streamed download data narrows a list of likely candidates after a search engine search has been performed. "Streamed download" means that the data is brought byte by byte to the searcher's computer and then discarded. During the streaming process the subject data, in binary form, is parsed into segments and each segment is provided with a signature based on the content of the segment. The signatures of the individual segments are then compared to signatures of the material that may have been infringed. If there are no matches, the streamed download data is discarded. If there are enough matches of the signatures, the offending data is displayed for visual inspection. Only caching and display takes place if a potential infringing segment is discovered.

2 Claims, 6 Drawing Sheets

500

DETECTING COPYRIGHT VIOLATION VIA STREAMED EXTRACTION AND SIGNATURE ANALYSIS IN A METHOD, SYSTEM AND PROGRAM

BACKGROUND OF THE INVENTION

1. Technical Field

The present invention generally relates to copyright material and in particular to discovering copyright infringement on a network, including the Internet. Still more particularly, the present invention relates to discovering copyright infringement without infringing on copyright material.

2. Description of the Related Art

Copyright infringement is a major problem on the Internet (Web). Digital documents like Web pages, MP3 audio, etc. are very easy to copy and put on a Web site. Since the Web has documents on line that are reaching billions of pages it is extremely hard for a publisher to track down sites which have infringed on an author's copyright by posting copies of the author's original work. An article entitled "Extent of copyright infringement on the Web" in the Sep. 14, 1999 issue of *Fortune Investor News*, details the extent of copyright violations on the Web. "There are more than 2 million web sites offering, linking or referencing "warez," the Internet code word for illegal copies of software. This problem has increased significantly over the past three years, from roughly 100,000 warez sites two years ago, to 900,000 last year."

Generally, in the past, utilizing a search engine service to detect copyright infringement would suffice. Keywords would be entered into a search engine, which indexes a large portion of the Web, to determine candidate pages to search for copyright infringement. Typically hundreds, if not thousands of hits would be returned to the search engine based on the search criteria using keywords.

The candidate pages were then downloaded to the author or publisher's computer. The searcher would then perform more computer aided processing on the candidate pages to determine potential infringers. If there were just a few pages, reading the downloaded files would be the next step to determine if there were any infringement. However, there would be many files to inspect and this would require a further search that involved more complex pattern matching. This step would narrow the choices further so that visual inspection of the files could be made to see if a copyright was being violated.

Unfortunately, the passage of The Digital Millennium Copyright Act, signed into law on Oct. 28, 1998, has made the approach as described above untenable. The digital age has prompted the passage of strict laws on copyright protection by the United States Congress. A strict interpretation of the law would prevent anyone but exempted entities, from storing copies of copyrighted Web documents on their computer except for downloading incidental to viewing (caching and immediate viewing). While the law is complex the only clear exemptions are: Internet Service Providers (ISPs); search engines—as long as they do not profit directly; non-profit educational institutions and system caching.

Generally a publisher is not concerned about the copying of a line or two of text or a few bars of music because that is not a violation of the "fair-use" act for copying. What he is most concerned about is the copying of entire paragraphs or sections of music verbatim. Even if data could be downloaded "legally" to disk, typical pattern matching algorithms take an inordinate amount of time when the matching strings that are very long (e.g., a text paragraph).

Due to the billions of Web pages on the Internet, and The Digital Millennium Copyright Act, the process of detecting unauthorized posting or copyright infringement on the Web becomes nearly impossible. Therefore it would be desirable to provide a process that would enable an author or publisher to do a reasonably thorough search of the Internet for copyright infringers without violating. The Digital Millennium Copyright Act. Further, it would be desirable to detect Web pages that have copied or modified copyright digital data on the Internet, without extracting and storing pages to store and further process.

SUMMARY OF THE INVENTION

It is therefore one object of the present invention to search the Internet for copyright infringing material.

It is another object of the present invention to review the bulk of potential infringing material automatically.

It is yet another object of the present invention to review the bulk of potential infringing material without violating current digital copyright laws.

The foregoing objects are achieved as is now described. Signature analysis of streamed download data narrows a list of likely candidates after a search engine search has been performed. "Streamed download" means that the data is brought byte by byte to the searcher's computer and then discarded. During the streaming process the subject data, in binary form, is parsed into segments and each segment is provided with a signature based on the content of the segment. The signatures of the individual segments are then compared to signatures of the material that may have been infringed. If there are no matches, the streamed download data is discarded. If there are enough matches of the signatures, the offending data is displayed for visual inspection. Only caching and display takes place if a potential infringing segment is discovered.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
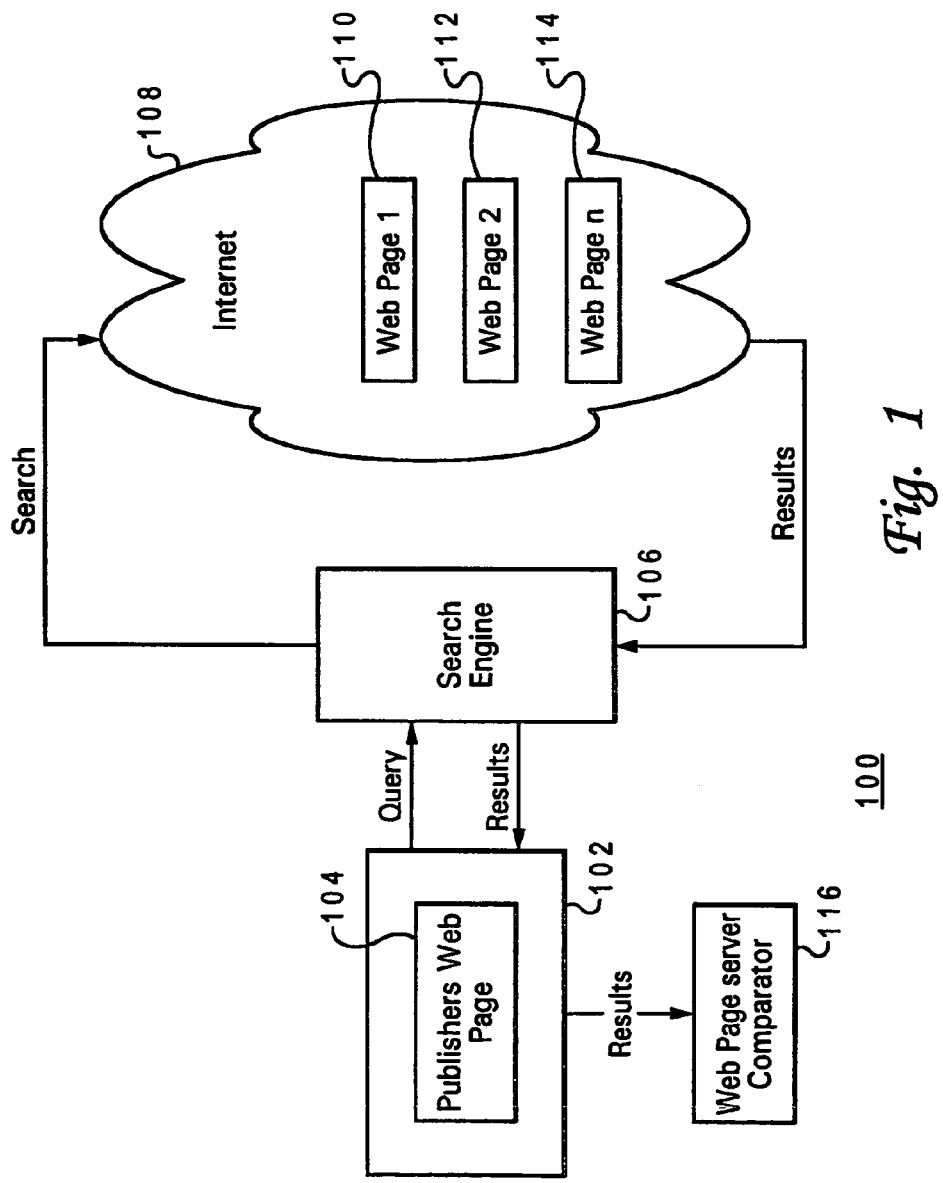
FIG. 1 depicts a high-level block diagram of a system for detecting copyright violation on the Internet in which a preferred embodiment of the present invention may be implemented.

With reference now to the figures, and in particular with reference to FIG. 1, a high-level block diagram of a system for detecting copyright violation on the Internet in which a preferred embodiment of the present invention may be implemented, is depicted. System 100 comprises server (or computer) 102 containing copyright material 104, search engine 106 (whose program may be resident on a server connected to the web or computer 102), Internet 108, multiple web pages 110, 112, and 114 and comparator 116.

In order for an author or publisher to detect copyright violators on the Internet the copyright material must be available for comparison. In the present invention copyright material 104 is available on server 102. The author provides keywords, critical to copyright material 104, to search engine 106 in a query to search for potential infringers. Search engine 106, which may be located on server 102 or Internet 108, then searches its own database of Universal Resource Locator (URL) addresses and Internet 108, for web pages that contain the keywords.

Web page 1 110, Web page 2 112 through Web page n 114 are returned in the form of URLs to server 102. Signatures are generated from Web documents pointed to by each URL. These signatures are compared with known signatures of copyright material 104 through a comparator 116 to determine if there are any potential matches based on the occurrences of keywords. Web page comparator 116 to determine if there are any potential matches based on the number of keyword occurrences.

Figure 2:
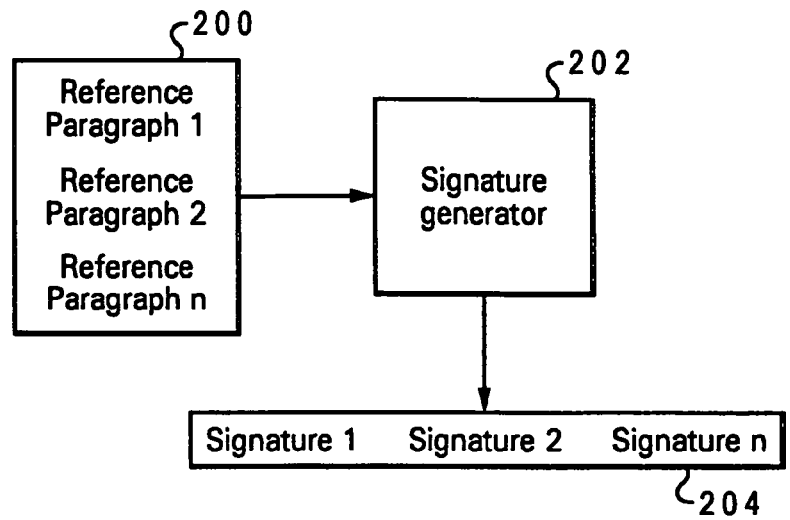
FIG. 2 is a high-level block diagram of a system for processing and providing electronic signatures for original copyright material in accordance with a preferred embodiment of the present invention.

Referring to FIG. 2, a high-level block diagram of a system for processing and providing electronic signatures for original copyright material in accordance with a preferred embodiment of the present invention is illustrated. Original copyright material 200 is parsed into data segments and converted to binary form. The converted data segments are then processed through signature generator 202 and corresponding electronic signatures 204 are generated. The signatures are stored to be utilized later for comparison with electronic signatures of potential infringing material.

Figure 3B:
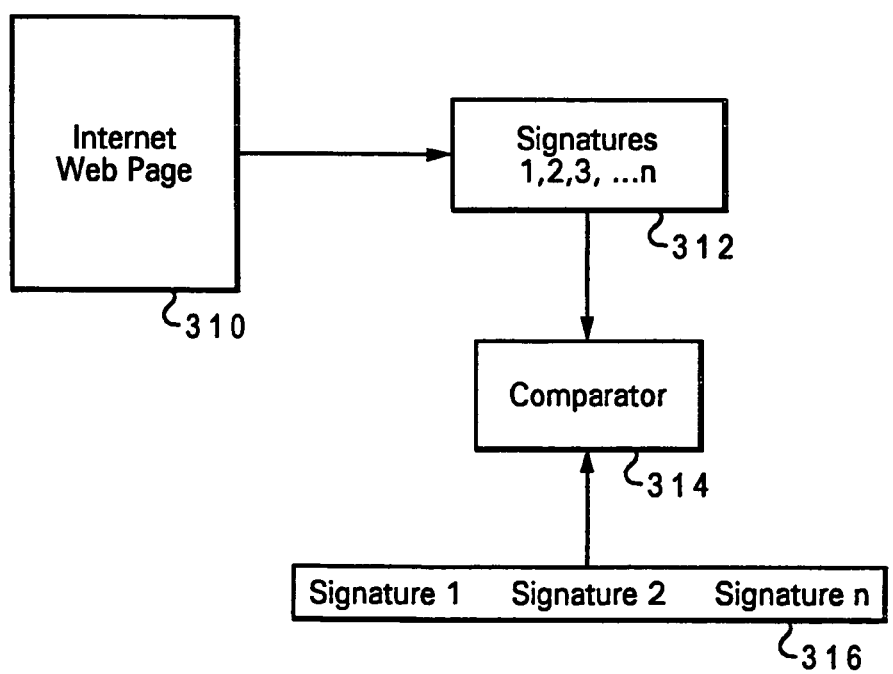
FIG. 3B is a high-level block diagram for providing electronic signatures for potentially infringing material for comparison to original copyright material in accordance with a preferred embodiment of the present invention.
Figure 3A:
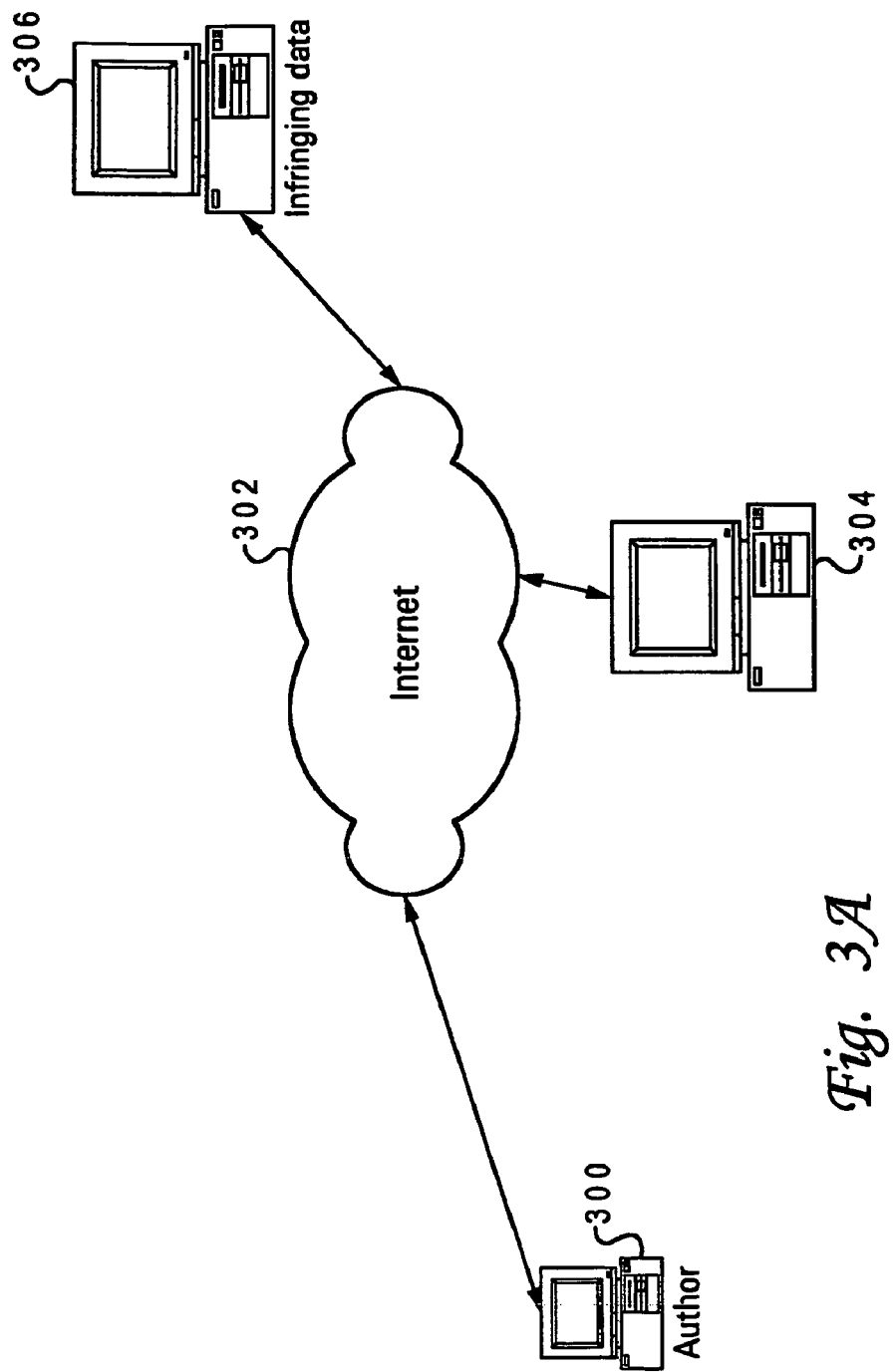
FIG. 3A depicts a high-level block diagram of a system for detecting copyright infringing material in which a preferred embodiment of the present invention may be implemented.

Referring now to FIG. 3A, a high-level block diagram of a system for detecting copyright infringing material in is which a preferred embodiment of the present invention may be implemented is depicted. Computer 300 (a computer associated with the author or publisher of copyrighted material) is connected to Internet 302. Search engine 304 may be resident on computer 300 or a separate server that is also connected to Internet 302. Either search engine may be utilized to perform a keyword search for possible infringing copyright material on the Internet. If potential infringing material is found on server 306, search engine 304 returns the URL of infringing server 306 and any other URL upon which potential infringing material is found. The material is parsed and provided with electronic signatures for comparison to the copyright material present on computer 300.

Referring to FIG. 3B, a high-level block diagram for providing electronic signatures for potentially infringing material in accordance with a preferred embodiment of the present invention, is depicted. Internet Web page 310, in this instance, has been determined to have potential infringing material on the web site. The URL of Internet web page 310 is returned to the site requesting the search. All URLs are then searched automatically. Signatures 312 for each data segment of the potential offending material from each URL are generated.

Signatures 312 are sent to comparator 314 as are signatures 316 of the original copyrighted material. Comparisons are made of the signatures, not the material itself, of both original and potential infringing material and any matches are returned to the searcher.

Figure 4:
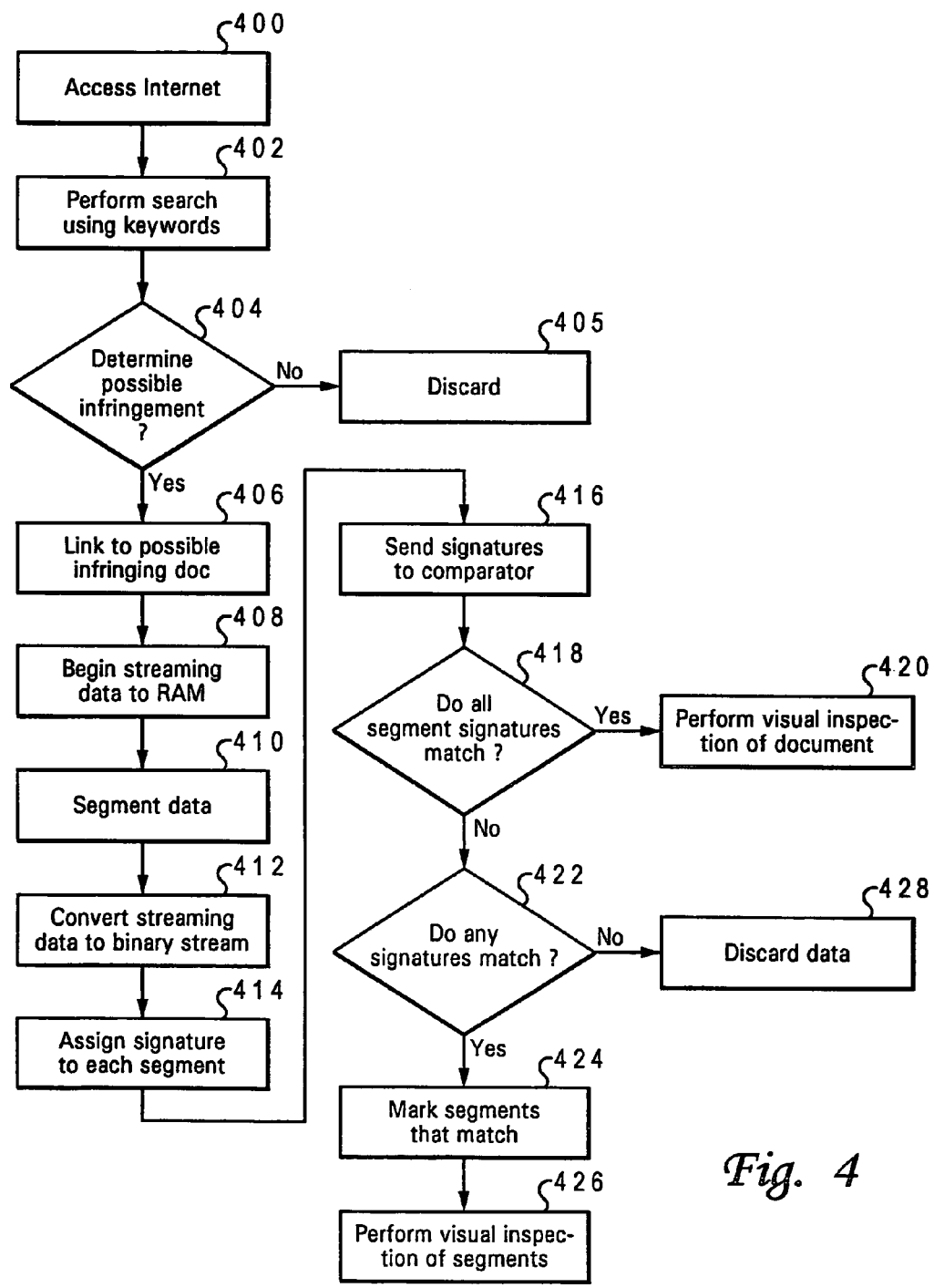
FIG. 4 depicts a method for detecting material on the Internet that infringes copyrights in accordance with a preferred embodiment of the present invention.

Referring now to FIG. 4, a method for detecting material on the Internet that infringes copyrights in accordance with a preferred embodiment of the present invention, is illustrated. In this example of the method, a textual document will be used as an example. The process may be applied to audio, video graphic—any file or material that can be posted to a web site and converted into streaming data and provided with electronic signatures. The process begins with step 400, which illustrates a searcher accessing the Internet. The process proceeds to step 402, which depicts a search being performed utilizing keywords that are critical to identifying potential infringing material. The search engine may be accessed on the searcher's computer or a search engine connected to the Internet. The process passes to step 404, which illustrates a determination of whether a file contains possible infringing documents. If enough keywords with enough frequency are found, a document is considered a potential infringing document. If there is no document found on the web site that contains enough instances of the keywords, the process passes to step 405. If there are documents found on the site that contain enough instances of the keywords, the process passes instead to step 406, which depicts the search engine providing a list of links to potential infringing documents.

The process next proceeds to step 408, which illustrates accessing one of the links on the list and beginning to process the referenced document. In this instance, the textual data is set for streaming to random access memory on the computer that is searching for the material. The process then passes to step 410, which illustrates parsing the textual data into segments. Next, the process moves to step 412, which depicts converting the parsed streaming data into a binary stream. The process then proceeds to step 414, which illustrates utilizing the binary data to provide an electronic signature for each segment. The process continues to step 416, which depicts signatures of the potentially infringing material being sent to a comparator for comparison to electronic signatures of the original, copyrighted material.

The process passes to step 418, which illustrates a determination of whether all the segment signatures of the offending material match all the segment signatures of the original material. If the determination is made that all signatures match, the process proceeds instead to step 420, which depicts loading the offending document to a visual display and visual inspection taking place. If the determination is made that all segment signatures do not match, the process continues to step 422, which illustrates a determination of whether any signatures match. If it is determined that no signatures match, the process then passes to step 428, which depicts discarding the download and moving to another link. If the process determines that there are electronic signatures of the offending material that match (paragraphs are each assigned a signature, so that means at least a paragraph is exactly the same) the process proceeds from 422 to step 424, which illustrates electronically marking the data segments that match. The process continues to step 426, which depicts the marked data segments being presented for visual inspection and confirmation.

Figure 5:
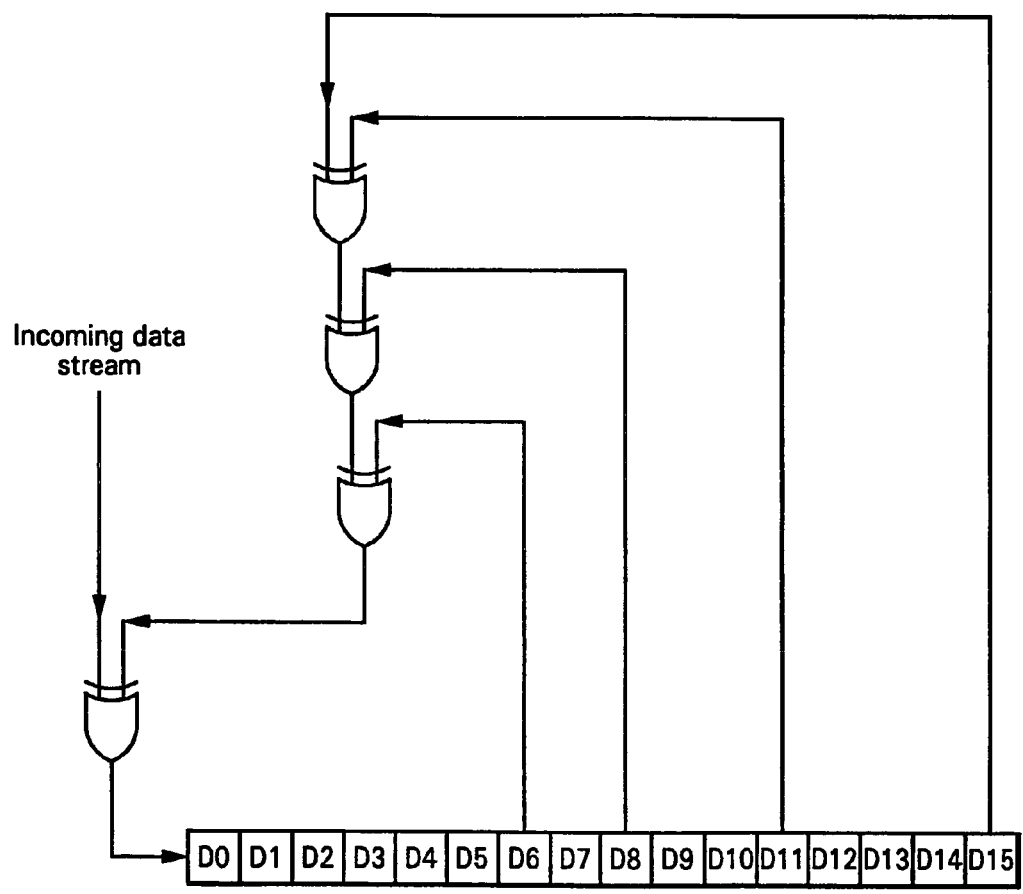
FIG. 5 is a prior art that illustrates a device for providing signature analysis in accordance with a preferred embodiment of the present invention.

Referring to FIG. 5, a device for providing signature analysis in accordance with a preferred embodiment of the present invention, is illustrated. A 16-bit linear feedback shift register that can be implemented in hardware or software for generating electronic signatures is used to compress a bit stream into a 16-bit unique signature. A signature is generated for each data segment or, in the case of text documents, paragraphs. The incoming bit stream from the original document is processed and signatures for the data segments are generated. Accuracy is important and a sixteen stage shift register detects a multi-bit error in a data stream with a probability of 99.998% and a single bit error with a probability of 100%. Signature analysis may be implemented in hardware or software and there are various techniques for signature analysis which may be substituted.

Figure 6:
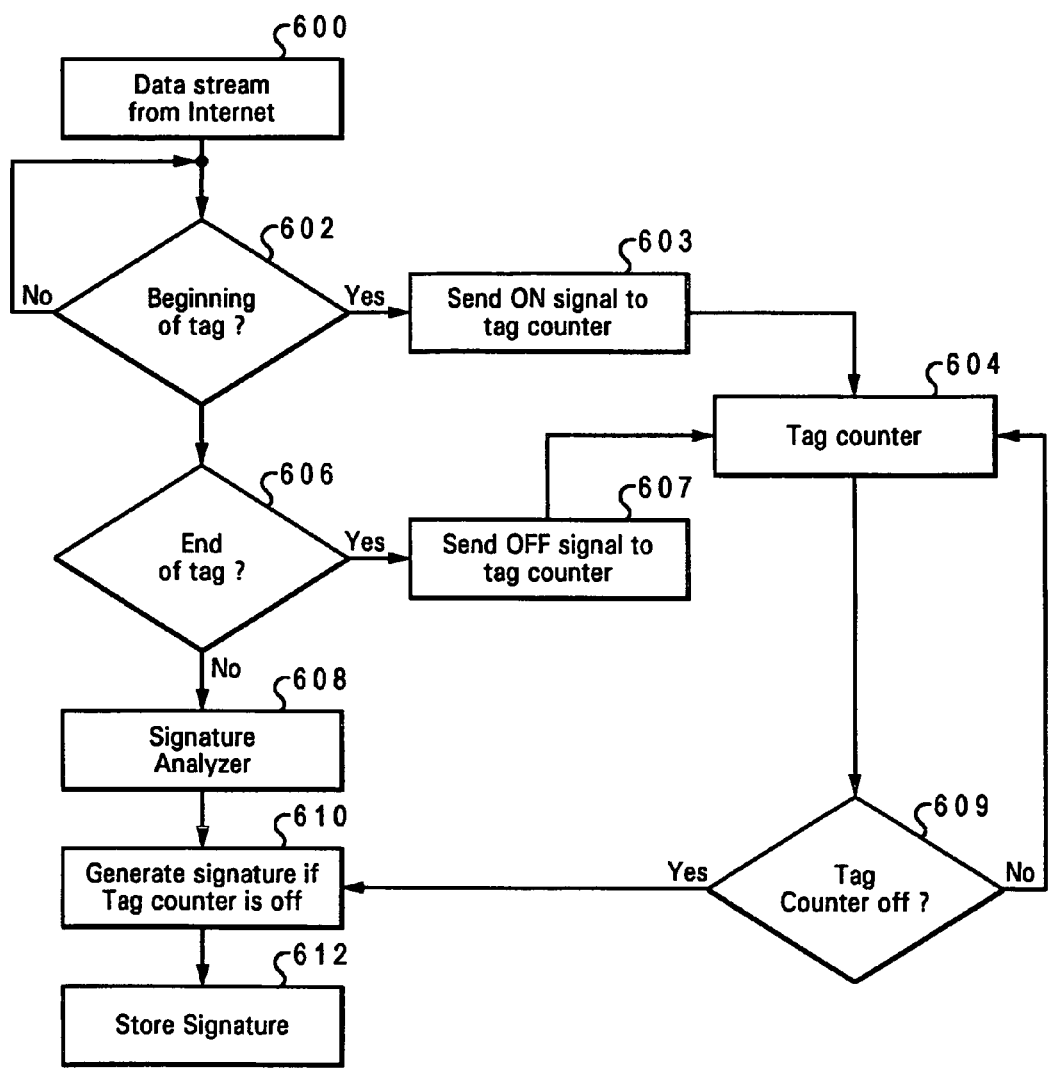
FIG. 6 depicts a method of generating a signature for a data segment in accordance with a preferred embodiment of the present invention.

Referring next to FIG. 6, a method of generating a signature for a data segment in accordance with a preferred embodiment of the present invention, is illustrated. An example of a portion of an HTML file is shown below:

<P> The Java 2D API enhances the graphics, text and imaging capabilities of the AWT, enabling the development of
richer user interfaces and new types of Java applications. Along with these richer graphics, font and image APIs, the Java 2D API supports enhanced color definition and composition, hit detection on arbitrary geometric shapes and text, and a uniform rendering model for printers and display drivers.</P>

The beginning of a paragraph (data segment) is marked by a "<P>" and the end of the paragraph is marked by "</P>". The above HTML paragraph is converted to binary form and will be seen as an incoming data stream from the Internet. The process begins with step 600, which depicts receiving a data stream from the Internet. The process of detecting copyright infringement is in progress and signature generation for the incoming data stream is commencing. The process proceeds to step 602, which illustrates a determination of whether an ON signal should be sent to the tag counter. As shown above, a <P> marker in HTML indicates the beginning of a paragraph (data segment) and when <P>, the paragraph beginning marker, is noted in the data stream, the process moves to step 603, which depicts an ON signal being sent to the Tag counter. If the determination is made that no beginning marker is detected, the process continues from step 602 to step 606, which illustrates a determination of whether an end marker, or end of tag, has been detected. If the determination is made that an end of tag has not been received, the process passes to step 608, which depicts the signature analyzer processing the data stream. If the determination is made that an end of tag bit is received, the process proceeds instead to step 607, which illustrates sending an OFF signal to the tag counter.

The process then continues to step 604, which depicts the tag counter receiving the end of tag signal. The process then passes to step 609, which illustrates a determination of whether the tag counter has received an OFF signal. If the determination is made that the tag counter has not received an off signal, the process passes to step 604, and continues to wait for an end of tag signal. If the determination is made the tag counter has received an OFF signal, the process passes instead to step 610, which depicts generating a signature of the data stream between the beginning and end of tag markers. The process then proceeds to step 612, which illustrates the system storing the signature for comparison to original, copyright material electronic signatures.

The present invention is faster than existing techniques and reduces the need for human intervention. Pages don't have to be saved—data is streamed and matching is done utilizing a one pass pattern matcher. Copyright infringement detection is made more deliberate and easier to accomplish. The use of signature matching rather than comparing infringing to original material allows for the automatic comparison of many questionable files in a short period of time which saves computing power and human intervention. Additionally, the detection is accomplished without infringing on the copyright of material that may not infringe. The present invention may be implemented in hardware as well as software.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for detecting copyright violation, said method comprising:
receiving a selectable data stream of suspected copyright infringing material;
using a linear shift generator to generate a first electronic signature for said data stream of said suspected copyright infringing material;
using a linear shift generator to generate a second electronic signature for an original copyright material;
comparing said first electronic signature with said second electronic signature, wherein a match of said first electronic signature with said second electronic signature indicates a likelihood that said suspected copyright infringing material and said original copyright material are the same;
parsing said data stream of suspected copyright infringing material into suspected copyright infringing material data segments;
generating a suspected copyright infringing material data segment electronic signature for each said suspected copyright infringing material data segment;
parsing said original copyright material into original copyright material data segments;
generating an original copyright material data segment electronic signature for each said original copyright material data segment;

determining that at least one of said suspected copyright infringing material data segment electronic signatures matches at least one of said original copyright material data segment electronic signatures; and visually examining said suspected copyright infringing material data segment having said suspected copyright infringing material data segment electronic signature matching said original copyright material data segment electronic signature.

2. A system for detecting copyright violation, said system comprising:

receiving means for receiving a selectable data stream of suspected copyright infringing material;

a linear shift register for generating a first electronic of said suspected material and a second electronic signature of an original copyright material;

comparator means for comparing said first electronic signature with said second electronic signature, wherein a match of said first electronic signature with said second electronic signature indicates a likelihood that said suspected copyright infringing material and said original copyright material are the same;

parsing means for parsing said data stream of suspected copyright infringing material into suspected copyright infringing material data segments;

means for generating a suspected copyright infringing material data segment electronic signature for each said suspected copyright infringing material data segment;

parsing means for parsing said original copyright material into original copyright material data segments;

means for generating an original copyright material data segment electronic signature for each said original copyright material data segment;

means for determining that at least one of said suspected copyright infringing material data segment electronic signatures matches at least one of said original copyright material data segment electronic signatures; and means for visually examining said suspected copyright infringing material data segment having said suspected copyright infringing material data segment electronic signature matching said original copyright material data segment electronic signature.

* * * * *